United States Patent
Chen et al.

(10) Patent No.: US 11,849,211 B2
(45) Date of Patent: Dec. 19, 2023

(54) VIDEO PROCESSING METHOD, TERMINAL DEVICE AND STORAGE MEDIUM

(71) Applicant: Beijing Bytedance Network Technology Co., Ltd., Beijing (CN)

(72) Inventors: Haidong Chen, Beijing (CN); Zhaoqin Lin, Beijing (CN); Xingdong Li, Beijing (CN); Xiaobin Guo, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/888,302

(22) Filed: Aug. 15, 2022

(65) Prior Publication Data
US 2022/0394192 A1 Dec. 8, 2022

Related U.S. Application Data

(63) Continuation of application No. PCT/CN2021/115083, filed on Aug. 27, 2021.

(30) Foreign Application Priority Data

Sep. 4, 2020 (CN) .......................... 202010922803.8

(51) Int. Cl.
*H04N 23/63* (2023.01)
*H04N 5/262* (2006.01)
*H04N 5/265* (2006.01)

(52) U.S. Cl.
CPC .......... *H04N 23/632* (2023.01); *H04N 5/265* (2013.01); *H04N 5/2628* (2013.01)

(58) Field of Classification Search
CPC .......... H04N 5/232935; H04N 5/2628; H04N 5/265; G06F 3/04845
See application file for complete search history.

(56) References Cited

U.S. PATENT DOCUMENTS

2005/0100319 A1* 5/2005 Saed ................ H04N 5/262
   348/E5.053
2009/0003712 A1* 1/2009 Mei ................ G06F 16/739
   382/225

(Continued)

FOREIGN PATENT DOCUMENTS

CN 103491298 A 1/2014
CN 104333699 A 2/2015

(Continued)

OTHER PUBLICATIONS

International Search Report issued in corresponding International Application No. PCT/CN2021/115083 dated Oct. 20, 2021.

(Continued)

*Primary Examiner* — Michael Roswell
(74) *Attorney, Agent, or Firm* — ARENTFOX SCHIFF LLP

(57) ABSTRACT

Provided are a video processing method, a terminal device and a storage medium. The video processing method includes: adding a first video capturing window in a video capturing interface and adjusting a frame of the first video capturing window in response to a first user operation (S101); capturing a first original video (S102); cropping the first original video according to the frame of the first video capturing window to obtain a first target video corresponding to the first video capturing window (S103). The frame of the video capturing window can be freely adjusted according to requirements of a user, which is beneficial to a video in emotion rendering, atmosphere building and subject highlighting, thereby improving user experience.

9 Claims, 7 Drawing Sheets

(56) References Cited

U.S. PATENT DOCUMENTS

| | | | |
|---|---|---|---|
| 2011/0292242 A1 | 12/2011 | Imai | |
| 2013/0155069 A1* | 6/2013 | Borders | G06T 11/60 345/441 |
| 2014/0023281 A1* | 1/2014 | Cok | H04N 1/00175 382/218 |
| 2014/0211065 A1* | 7/2014 | Sudheendra | H04N 5/2621 348/333.02 |
| 2015/0116542 A1 | 4/2015 | Lee | |

FOREIGN PATENT DOCUMENTS

| | | |
|---|---|---|
| CN | 104836956 A | 8/2015 |
| CN | 105162978 A | 12/2015 |
| CN | 105263049 A | 1/2016 |
| CN | 107087137 A | 8/2017 |
| CN | 107872623 A | 4/2018 |
| CN | 108769511 A | 11/2018 |
| CN | 109068166 A | 12/2018 |
| CN | 109348155 A | 2/2019 |
| CN | 110336968 A | 10/2019 |
| CN | 111050070 A | 4/2020 |
| CN | 111147955 A | 5/2020 |
| CN | 112004032 A | 11/2020 |
| EP | 3125524 A1 | 1/2017 |
| JP | 2018110335 A | 7/2018 |

OTHER PUBLICATIONS

Chinese Notice of Allowance issued in corresponding Chinese Application No. 202010922803.8, 4 pages.

First Chinese Office Action issued in corresponding Chinese Application No. 202010922803.8, 15 pages.

\* cited by examiner

VIDEO PROCESSING METHOD, TERMINAL DEVICE AND STORAGE MEDIUM

CROSS-REFERENCE TO RELATED APPLICATION

This application is a continuation of International Application No. PCT/CN2021/115083, filed on Aug. 27, 2021, which claims priority to Chinese Patent Application No. 202010922803.8, filed on Sep. 4, 2020 and entitled "VIDEO PROCESSING METHOD, TERMINAL DEVICE AND STORAGE MEDIUM". The disclosures of the aforementioned applications are hereby incorporated by reference in their entireties.

TECHNICAL FIELD

Embodiments of the present disclosure relate to the field of terminal device technologies and, in particular, to a video processing method, a terminal device, a storage medium, a computer program product, and a computer program.

BACKGROUND

With the development of terminal device technologies, a video shooting function is generally configured on terminal devices, which is convenient for users to capture videos anytime and anywhere.

In the prior art, a video application (Application, App for short) installed on a terminal is often directly used for video capturing and processing in order that a user can conveniently share a captured video with others or perform a special effects processing on the captured video.

However, video pictures captured by existing video Apps are undiversified and fixed, which is impossible for emotion rendering, atmosphere building and subject highlighting, thereby resulting in poor user experience.

SUMMARY

Embodiments of the present disclosure provide a video processing method, a terminal device, a storage medium, a computer program product and a computer program so as to overcome the problem that there is poor user experience resulting from impossibility for emotion rendering, atmosphere building and subject highlighting since video pictures captured by existing video Apps are undiversified and fixed.

In a first aspect, an embodiment of the present disclosure provides a video processing method including: adding a first video capturing window in a video capturing interface and adjusting a frame of the first video capturing window in response to a first user operation; capturing a first original video; cropping the first original video according to the frame of the first video capturing window to obtain a first target video corresponding to the first video capturing window.

In a second aspect, an embodiment of the present disclosure provides a terminal device including: a response unit, configured to add a first video capturing window in a video capturing interface and adjust a frame of the first video capturing window in response to a first user operation; a capturing unit, configured to capture a first original video; and a processing unit, configured to crop the first original video according to the frame of the first video capturing window to obtain a first target video corresponding to the first video capturing window.

In a third aspect, an embodiment of the present disclosure provides a terminal device including: at least one processor and a memory; where the memory has a computer-executable instruction stored therein; the at least one processor executes the computer-executable instruction stored in the memory to enable the at least one processor to perform the video processing method as described above according to the first aspect and various possible designs of the first aspect.

In a fourth aspect, an embodiment of the present disclosure provides a computer-readable storage medium in which a computer-executable instruction is stored, where when the computer-executable instruction is executed by a processor, the video processing method as described above according to the first aspect and various possible designs of the first aspect is implemented.

In a fifth aspect, an embodiment of the present disclosure provides a computer program product including a computer-executable instruction, where when the computer-executable instruction is executed by a processor, the video processing method as described above according to the first aspect and various possible designs of the first aspect is implemented.

In a sixth aspect, an embodiment of the present disclosure provides a computer program. When the computer program is executed by a processor, the video processing method as described above according to the first aspect and various possible designs of the first aspect is implemented.

The present embodiments provide a video processing method, a terminal device and a storage medium. The method is applied to the terminal device, and allows for: adding a first video capturing window in a video capturing interface and adjusting a frame of the first video capturing window in response to a first user operation; capturing a first original video; cropping the first original video according to the frame of the first video capturing window to obtain a first target video corresponding to the first video capturing window. That is, in the present embodiments, the frame of the video capturing window can be freely adjusted according to requirements of a user, which is beneficial to a video in emotion rendering, atmosphere building and subject highlighting, thereby improving user experience.

BRIEF DESCRIPTION OF DRAWINGS

In order to explain the technical solutions in the embodiments of the present disclosure or the prior art more clearly, the following will briefly introduce the drawings to be used in the description of the embodiments or the prior art. Obviously, the drawings in the following description are intended for some embodiments of the present disclosure, and for those of ordinary skilled in the field, other drawings can be obtained based on these drawings without any creative effort.

DESCRIPTION OF EMBODIMENTS

In order to describe objectives, technical solutions, and advantages of embodiments of the present disclosure more clearly, the technical solutions in the embodiments of the present disclosure will be described hereunder clearly and comprehensively with reference to the accompanying drawings in the embodiments of the present disclosure. Apparently, the described embodiments are only a part of embodiments of the present disclosure, rather than all embodiments of the present disclosure. All other embodiments obtained by those of ordinary skilled in the field based on the embodiments of the present disclosure without any creative effort shall fall into the protection scope of the present disclosure.

With the development of terminal device technologies, a video shooting function is generally configured on terminal devices, which is convenient for users to capture videos anytime and anywhere.

Figure 1:
FIG. 1 is a schematic diagram of a video capturing interface of a terminal device in the prior art.

In the prior art, a video App (for example, TikTok App) installed on a terminal is often directly used for video capturing and processing in order that a user can conveniently share a captured video with others or perform a special effects processing on the captured video. FIG. 1 is a schematic diagram of a video capturing interface of a terminal device in the prior art. With reference to FIG. 1, it can be seen that the frame corresponding to the existing video App generally covers the video capturing interface of the entire terminal device, that is, the video capturing window has an undiversified and fixed frame. However, such undiversified and fixed frame is not conducive to emotion rendering, atmosphere building and subject highlighting, thereby resulting in poor user experience.

In light of this problem, the technical idea of the present disclosure is that, the frame of the video capturing window can be freely adjusted according to requirements of a user, which is beneficial to a video in emotion rendering, atmosphere building and subject highlighting, thereby improving user experience.

Figure 2:
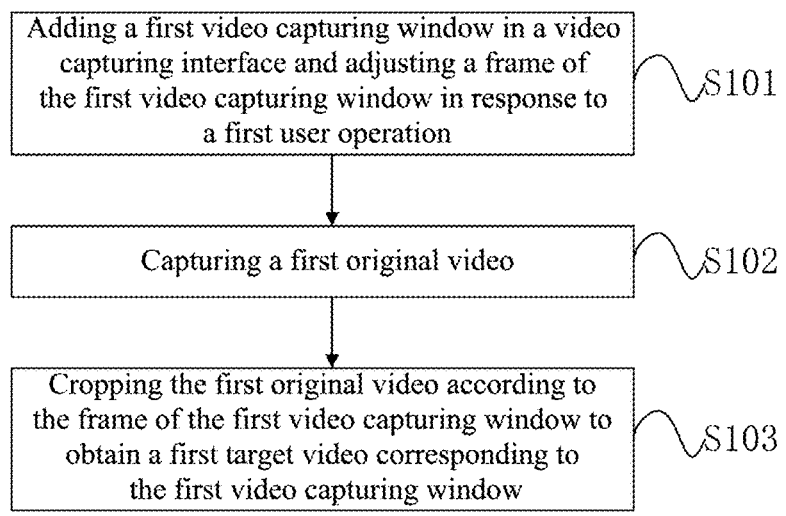
FIG. 2 is a first schematic flowchart of a video processing method according to an embodiment of the present disclosure.

With reference to FIG. 2, FIG. 2 is a first schematic flowchart of a video processing method according to an embodiment of the present disclosure. The method of the present embodiment can be applied to a terminal device, where the terminal device has a video shooting function. The video processing method includes the following.

S101, adding a first video capturing window in a video capturing interface and adjusting a frame of the first video capturing window in response to a first user operation.

Specifically, a user can open a camera icon or a video App icon on the terminal device to enter a video capturing interface. On the video capturing interface, the user can add a video capturing window on the video capturing interface by clicking an add function on the video capturing interface, and adjust a frame of the video capturing window according to the user's operation.

In an embodiment of the present disclosure, the frame of the first video capturing window is used to indicate a position, a shape and a dimension of the first video capturing window. Specifically, the position, the shape and the dimension of the video capturing window on the video capturing interface can be adjusted according to the user's operation.

In an embodiment of the present disclosure, Step S101 of adding the first video capturing window in the video capturing interface and adjusting the frame of the first video capturing window in response to the first user operation includes: displaying a plurality of selectable frames; and determining the frame of the first video capturing window from the plurality of selectable frames in response to a user selection operation.

Figure 3A:
FIG. 3a is an example diagram of a frame according to an embodiment of the present disclosure.

Specifically, the terminal device is preconfigured with a plurality of frames, each frame of which has a different frame attribute. These frames are displayed on the video capturing interface as options, and then the terminal device determines the frame of the video capturing window from the plurality of selectable frames in response to a user selection operation. Optionally, the preconfigured frames are generally in regular shapes, such as a rectangle, a circle, and the like. For example, FIG. 3a is an example diagram of a frame according to an embodiment of the present disclosure. With reference to FIG. 3a, it can be seen that a plurality of selectable frames are arranged and displayed at the bottom of the video capturing interface, such as the rectangle, the circle and the like of different dimension scales. When the user selects the circle, the frame of the video capturing window is circular.

In an embodiment of the present disclosure, Step S101 of adding the first video capturing window in the video capturing interface and adjusting the frame of the first video capturing window in response to the first user operation includes: in response to a user addition operation, adding a first video capturing window having a preset frame in the video capturing interface; and in response to a user drawing operation, adjusting the frame of the first video capturing window.

Figure 3B:
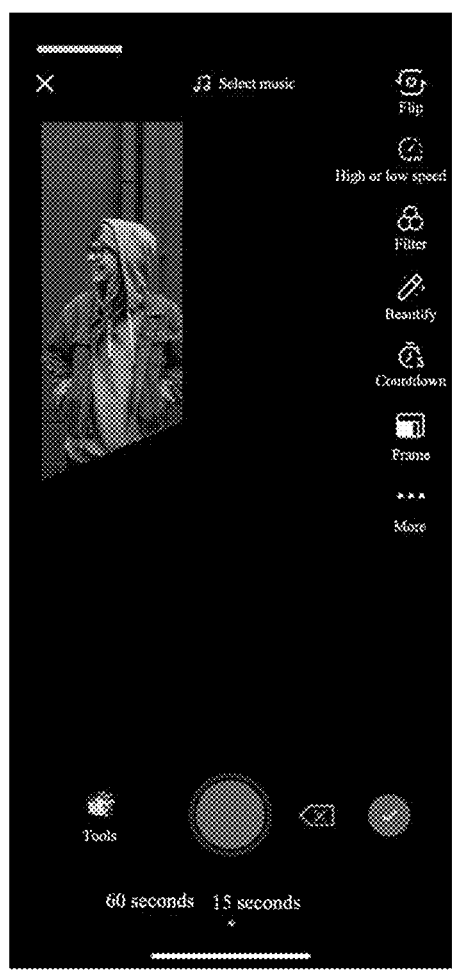
FIG. 3b is another example diagram of a frame according to an embodiment of the present disclosure.

In the present embodiment, the user may customize the frame of the video capturing window. Specifically, the user first adds a video capturing window having a preset frame in the video capturing interface, and then adjusts the preset frame to a user desired frame according to a user drawing operation. Optionally, a user-defined frame is generally of an irregular shape. For example, if the preset frame is a square, the frame of the video capturing window initially added by the user is a square. At this point, the user drawing operation can be received to adjust the frame of the video capturing window from the square to an irregular shape, such as the irregular frame shown in FIG. 3b.

S102, capturing a first original video.

Specifically, the video captured by the camera of the terminal device is called an original video.

S103, cropping the first original video according to the frame of the first video capturing window to obtain a first target video corresponding to the first video capturing window.

Specifically, the original video can be cropped according to the frame of the video capturing window, that is, information such as the position, the dimension, and the shape of the frame on the video capturing interface, to obtain a target video corresponding to the video capturing window. Optionally, after the target video is obtained, the target video can be played in the video capturing window by means of clicking a play function button on the video capturing interface.

In an embodiment of the present disclosure, S103 of cropping the first original video according to the frame of the first video capturing window to obtain the first target video corresponding to the first video capturing window includes: determining an externally attached graphic corresponding to the frame of the first video capturing window, and scaling the first original video into the externally attached graphic, where the externally attached graphic has a same shape as a picture of the first original video; cropping a video picture in the externally attached graphic according to the frame of the first video capturing window to obtain the first target video corresponding to the first video capturing window.

Specifically, an original video picture captured by the terminal device generally covers the entire video capturing interface. To obtain a clearer target video, in the present embodiment, an externally attached graphic having a same shape as the original video picture can be externally attached at the periphery of the frame of the video capturing window. For example, when the original video picture is a rectangle, the externally attached graphic is a proportionally reduced rectangle, and when the original video picture is a circle, the externally attached graphic is a circle. After that, the original video is scaled into the externally attached graphic, and then the video picture scaled into the externally attached graphic is cropped according to the shape of the frame of the video capturing window, so as to obtain a target video.

Figure 4:
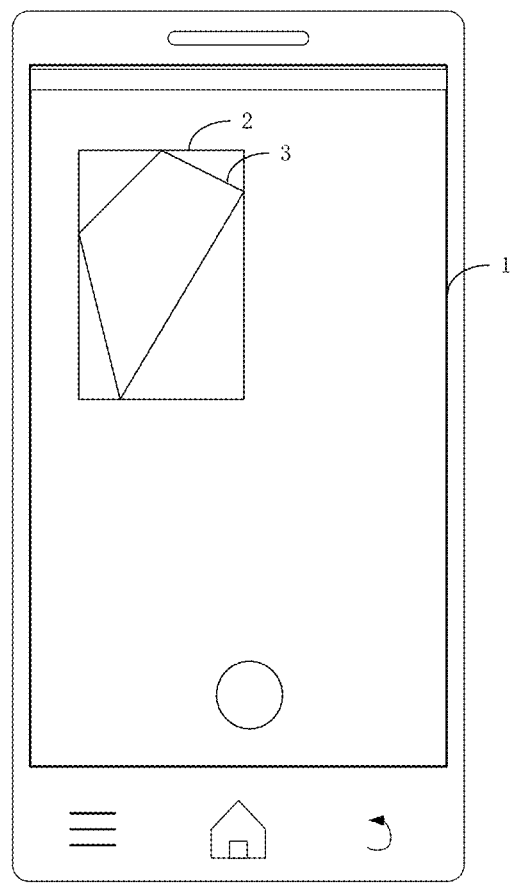
FIG. 4 is a schematic diagram of a process for acquiring a target video according to an embodiment of the present disclosure.

For example, FIG. 4 is a schematic diagram of a process for acquiring a target video according to an embodiment of the present disclosure. Description is made by taking an example where the original video picture is a rectangle covering the entire video capturing interface 1, firstly, the user can select or customize the frame 3 of the video capturing window on the video capturing interface 1, then determine an externally attached rectangle 2 of the frame 3, where the externally attached rectangle 2 has a same shape as the original video picture; then scale the original video into the externally attached rectangle 2, and then crop the redundant part of the video picture of the externally attached rectangle 2 according to the shape of the frame 3, and finally obtain a target video corresponding to the frame 3 of the video playing window.

The video processing method provided in the present embodiment is applied to a terminal device. The method allows for: adding a first video capturing window in a video capturing interface and adjusting a frame of the first video capturing window in response to a first user operation; capturing a first original video; cropping the first original video according to the frame of the first video capturing window to obtain a first target video corresponding to the first video capturing window. In the present embodiment, the frame of the video capturing window can be freely adjusted according to requirements of a user, which is beneficial to a video in emotion rendering, atmosphere building and subject highlighting, thereby improving user experience.

Figure 5:
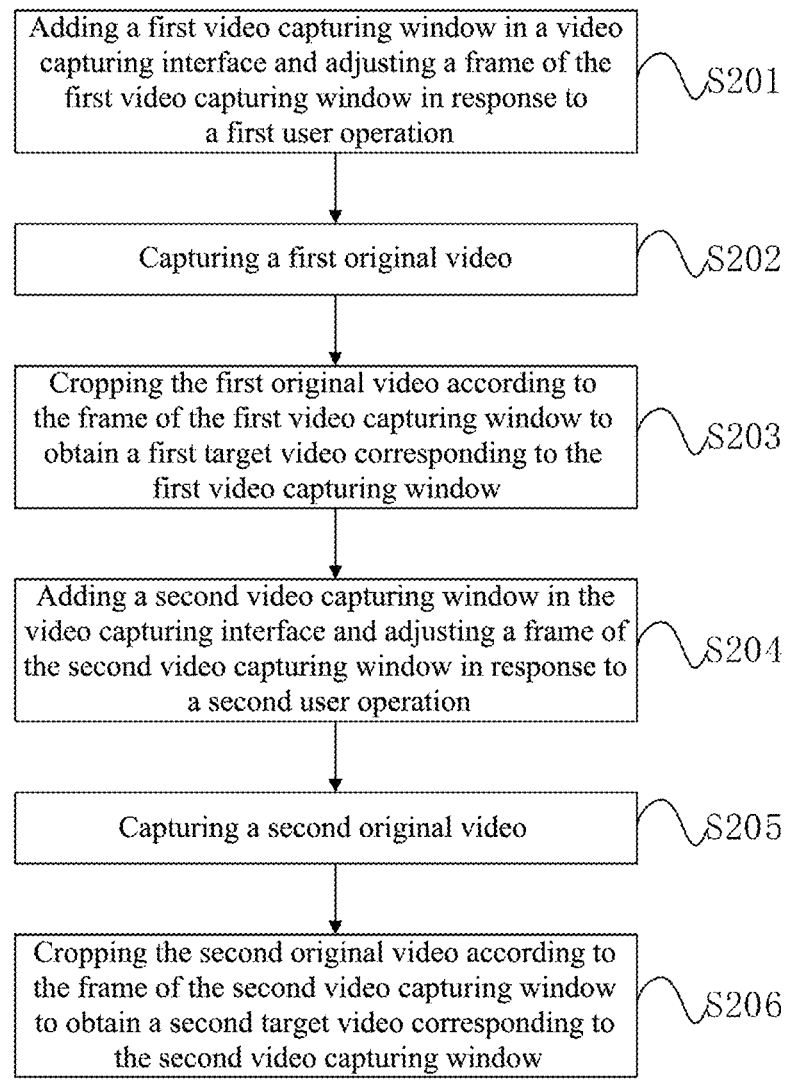
FIG. 5 is a second schematic flowchart of a video processing method according to an embodiment of the present disclosure.

On the basis of the foregoing embodiments, FIG. 5 is a second schematic flowchart of a video processing method according to an embodiment of the present disclosure. As shown in FIG. 5, the video processing method includes the following.

S201, adding a first video capturing window in a video capturing interface and adjusting a frame of the first video capturing window in response to a first user operation.

S202, capturing a first original video.

S203, cropping the first original video according to the frame of the first video capturing window to obtain a first target video corresponding to the first video capturing window.

S204, adding a second video capturing window in the video capturing interface and adjusting a frame of the second video capturing window in response to a second user operation.

S205, capturing a second original video.

S206, cropping the second original video according to the frame of the second video capturing window to obtain a second target video corresponding to the second video capturing window.

The first video capturing window and the second video capturing window are located in different areas of the video capturing interface.

In the present embodiment, Steps S201, S202 and S203 respectively conform to Steps S101, S102 and S103 in the foregoing embodiments. Reference may be made to the discussion of Steps S101, S102 and S103 for detailed discussion, which will not be described here again for the sake of redundancy.

Different from the foregoing embodiments, in order to further improve the user's video viewing experience, the present embodiment further allows for: after the obtaining the first target video corresponding to the first video capturing window, adding a second video capturing window in the video capturing interface and adjusting a frame of the second video capturing window in response to a second user operation; capturing a second original video; cropping the second original video according to the frame of the second video capturing window to obtain a second target video corresponding to the second video capturing window; where the first video capturing window and the second video capturing window are located in different areas of the video capturing interface.

Specifically, the user can add a plurality of video capturing windows in different areas of the video capturing interface, and adjust the frame of each of the video capturing windows. For example, firstly, add a first video capturing window in a certain area of a video capturing interface in response to a first user operation and adjust a frame of the first video capturing window, then crop the captured first original video to obtain a first target video; after that, add a second video capturing window in another area on the video capturing interface and adjust a frame of the second video capturing window, and then crop the captured second original video to obtain a second target video. Analogously, one may proceed with adding a third video capturing window in a different area of the video capturing interface to obtain a third target video; and continually adding a fourth video capturing window to obtain a fourth target video, and so forth, up to reception of a stop instruction from the user.

The stop instruction may be generated in the following manner but not limited to the following manner: 1) upon reception of the stop instruction sent by the user; 2) the stop instruction is generated upon detection that the video capturing window has been filled with videos in entirety; 3) the stop instruction is generated upon detection that the video capturing interface of the terminal device has no area to place a new video capturing window.

It should be noted that the above-described method can be used to enable inclusion of a plurality of video capturing windows in the same video capturing interface, that is, adding a video capturing window on the video capturing interface to capture a segment of video and further adding a video capturing window to capture a further segment of video; it is also possible to firstly add a plurality of video capturing windows on the video capturing interface, and then sequentially select one of the video capturing windows for video capturing.

In an embodiment of the present disclosure, after the second target video corresponding to the second video capturing window is obtained, the method further includes: generating a composite video according to the first target video and the second target video; where an image area of the composite video includes a first area for presenting an image of the first target video and a second area for presenting an image of the second target video; the image area of the composite video is determined based on the video capturing interface, the first area matches the frame of the first video capturing window, and the second area matches the frame of the second video capturing window.

In an embodiment of the present disclosure, during a playing process of the composite video, the first target video is played in the first area, and the second target video is played in the second area following completion of playing of the first target video.

Specifically, after multiple target videos are acquired, it is possible to composite the target videos. When the composite video is played, the target videos can be played in sequence according to the capturing sequence thereof. Description is made by taking three target videos as an example: firstly, the user adds and adjusts a frame of a first video capturing window on a video capturing interface, and crops a first original video according to the frame of the first video capturing window to obtain a first target video; after that, add and adjust a frame of a second video capturing window on the video capturing interface, and then crop a second original video according to the frame of the second video capturing window to obtain a second target video; after that, add a third video capturing window on the video capturing interface, and crop a third original video according to the frame of the third video capturing window to obtain a third target video; then composite the first target video, the second target video and the third target video to generate a composite video, where for an image area of the composite video, a first area matches the frame of the first video capturing window and is used for presenting an image of the first target video, a second area matches the frame of the second video capturing window and is used for presenting an image of the second target video, and a third area matches the frame of the third video capturing window and is used for presenting an image of the third target video; during playing of the composite video, the first target video is played in the first area firstly, and then the second target video is played in the second area following completion of playing of the first target video, and then the third target video is played in the third area following completion of playing of the second target video. As such, in the present embodiment, the target videos are played sequentially in the areas matching the frames of the respective video playing windows, which is conducive to the user in getting knowledge of the sequence of events and improving the user's video viewing experience.

Optionally, during the playing of the composite video, the playing order of the target videos may also be adjusted in response to a user sorting operation.

For example, assuming that the original composite video is played in the order of the first target video, the second target video and the third target video, if the user wants to change the playing order of the target videos, e.g., performing playing in the order of the second target video, the first target video and the third target video, then upon reception of a user sorting operation, an adjustment may be made to play the composite video in sequence according to the order of the second target video, the first target video and the third target video. As such, in the present embodiment, the playing order of the target videos can be changed according to user requirements during a playing process of the video, which further improves user experience.

Optionally, before Step S201, the method further includes: displaying a plurality of selectable templates, where the templates are composed of a plurality of frames; and determining a first template from the plurality of selectable templates in response to a user trigger operation.

Figure 6A:
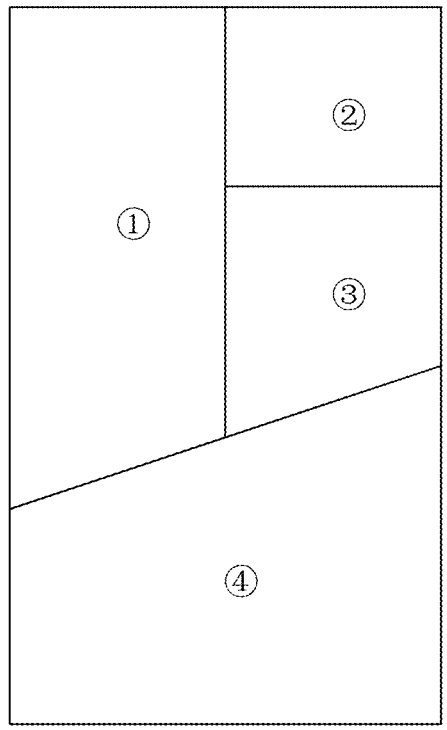
FIG. 6a is an example diagram of a template according to an embodiment of the present disclosure.
Figure 6B:
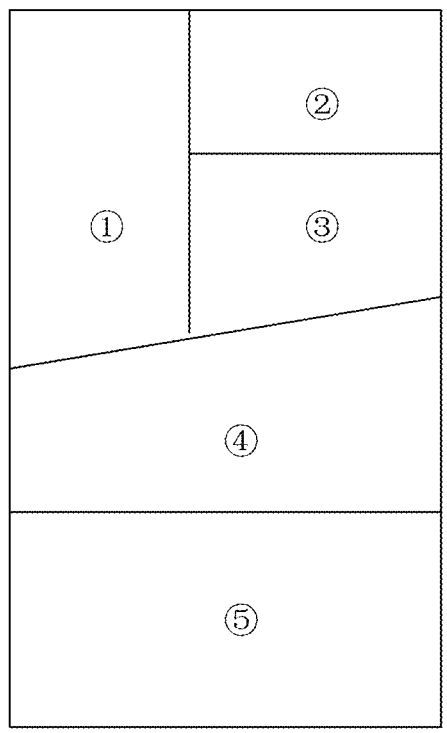
FIG. 6b is another example diagram of a template according to an embodiment of the present disclosure.

Specifically, the terminal device is pre-configured with a plurality of templates, of which each template may be composed of different numbers or different shapes of frames. FIG. 6*a* is an example diagram of a template according to an embodiment of the present disclosure, as shown in FIG. 6*a*, one template provided according to the embodiment of the present disclosure is composed of four irregular frames; FIG. 6*b* is another example diagram of a template according to an embodiment of the present disclosure, as shown in FIG. 6*b*, the other template provided according to the embodiment of the present disclosure is composed of five irregular frames. In the present embodiment, a plurality of selectable templates are displayed on the video capturing interface. It is possible to select one template from the plurality of selectable templates in response to a user trigger operation; after the template is selected, it is possible to successively indicate in response to the first user operation that a certain frame in the template corresponds to a position that is the frame of the video capturing window, and then perform video capturing. Description is made by taking an example where FIG. 6*a* is the selected template: upon reception of a first user operation, the frame marked with ① is selected as a frame of a first video capturing window to capture a first target video, then upon reception of a second user operation, the frame marked with ② is selected as a frame of a second video capturing window to capture a second target video, then upon reception of a third user operation, the frame marked with ③ is selected as a frame of a third video capturing window to capture a third target video, and finally upon reception of a fourth user operation from the user, the frame marked with ④ is selected as a frame of a fourth video capturing window to capture a fourth target video; video compositing is performed upon completion of the capturing; when the final composite video is played, the corresponding target videos are played in sequence within the frames marked with ①, ②, ③ and ④ according to the capturing sequence. As such, in the present embodiment, by means of selecting a template composed of a plurality of frames, the user can be prevented from needing to adjust the frames of the video capturing windows multiple times, thereby improving the video processing efficiency.

Optionally, after the first template is determined, upon entry into pictures of the template, a plurality of selectable frames can be displayed corresponding to respective frame areas in the template; in response to a user selection operation, determine the frame of the first video capturing window from the plurality of selectable frames; or in response to a user drawing operation, adjust the frame of the video capturing window, that is, after the template is determined, the terminal device may also change the shape, the dimension, the position or the like of each frame in the template.

With regard to the video processing method provided in the present embodiment, the method allows for: adding a first video capturing window in a video capturing interface and adjusting a frame of the first video capturing window in response to a first user operation; capturing a first original video; cropping the first original video according to the frame of the first video capturing window to obtain a first target video corresponding to the first video capturing window; adding a second video capturing window in the video capturing interface and adjusting a frame of the second video capturing window in response to a second user operation; capturing a second original video; cropping the second original video according to the frame of the second video capturing window to obtain a second target video corresponding to the second video capturing window; where the first video capturing window and the second video capturing window are located in different areas of the video capturing interface; in the present embodiment, according to requirements of a user, a plurality of video capturing windows can be added on the video capturing interface, and the frame of each of the video capturing windows can be freely adjusted, and moreover, a video corresponding to the frame can be played on each video capturing window, all of which are beneficial to the video in emotion rendering, atmosphere building and subject highlighting, thereby improving user experience.

Figure 7:
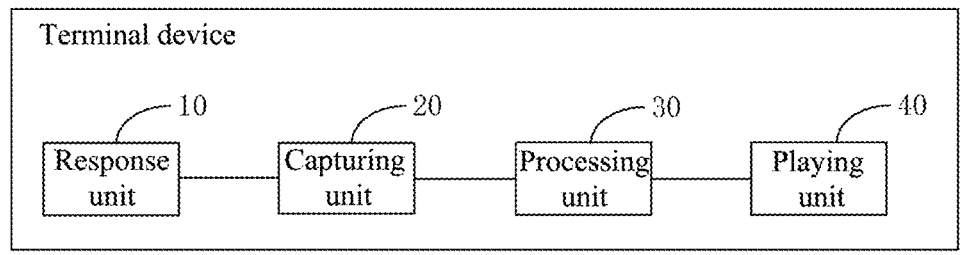
FIG. 7 is a structural block diagram of a terminal device according to an embodiment of the present disclosure.

Corresponding to the video processing method in the above embodiments, FIG. 7 is a structural block diagram of a terminal device according to an embodiment of the present disclosure. For ease of description, only the parts related to the embodiments of the present disclosure are shown. With reference to FIG. 7, the terminal device includes: a response unit 10, a capturing unit 20 and a processing unit 30.

The response unit 10 is configured to add a first video capturing window in a video capturing interface and adjust a frame of the first video capturing window in response to a first user operation; the capturing unit 20 is configured to capture a first original video; the processing unit 30 is configured to crop the first original video according to the frame of the first video capturing window to obtain a first target video corresponding to the first video capturing window.

In an embodiment of the present disclosure, after the first target video corresponding to the first video capturing window is obtained, the response unit 10 is further configured to add a second video capturing window in the video capturing interface and adjust a frame of the second video capturing window in response to a second user operation; the capturing unit 20 is further configured to capture a second original video; the processing unit 30 is further configured to crop the second original video according to the frame of the second video capturing window, and obtain a second target video corresponding to the second video capturing window; where the first video capturing window and the second video capturing window are located in different areas of the video capturing interface.

In an embodiment of the present disclosure, the processing unit 30 is further configured to: after the second target video corresponding to the second video capturing window is obtained, generate a composite video according to the first target video and the second target video; where an image area of the composite video includes a first area for presenting an image of the first target video and a second area for presenting an image of the second target video; the image area of the composite video is determined based on the video capturing interface, the first area matches the frame of the first video capturing window, and the second area matches the frame of the second video capturing window.

In an embodiment of the present disclosure, the terminal device further includes a playing unit 40. The playing unit 40 is configured to: during a playing process of the composite video, play the first target video in the first area and play the second target video in the second area following completion of playing of the first target video.

In an embodiment of the present disclosure, the processing unit 30 is specifically configured to: determine an externally attached graphic corresponding to the frame of the first video capturing window, and scale the first original video into the externally attached graphic, where the externally attached graphic has a same shape as a picture of the first original video; crop a video picture in the externally attached graphic according to the frame of the first video capturing window to obtain the first target video corresponding to the first video capturing window.

In an embodiment of the present disclosure, the response unit 10 is specifically configured to: display a plurality of selectable frames; and determine the frame of the first video capturing window from the plurality of selectable frames in response to a user selection operation.

In an embodiment of the present disclosure, the response unit 10 is specifically configured to: in response to a user addition operation, add a first video capturing window having a preset frame in the video capturing interface; and in response to a user drawing operation, adjust the frame of the first video capturing window.

In an embodiment of the present disclosure, the frame of the first video capturing window is used to indicate a position, a shape and a dimension of the first video capturing window.

The terminal device provided in the present embodiment can be used to execute the technical solutions in the foregoing method embodiments; implementation principles and technical effects therebetween are similar, and details will not be described herein again in the present embodiment.

Figure 8:
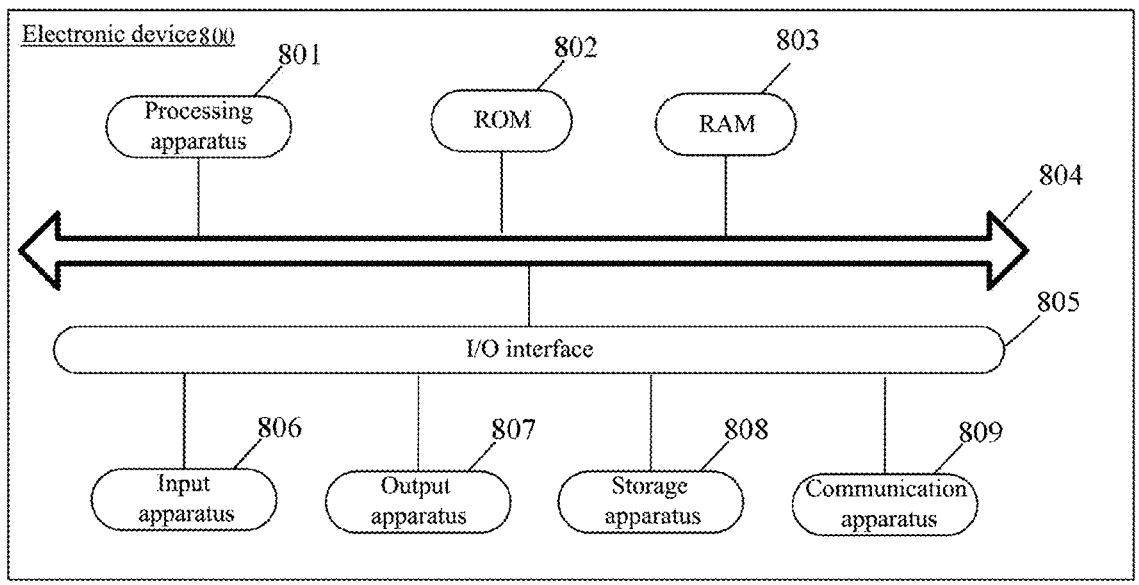
FIG. 8 is a schematic diagram of a hardware structure of an electronic device according to an embodiment of the present disclosure.

Reference is made to FIG. 8, which shows a schematic structural diagram of an electronic device 800 for implementing an embodiment of the present disclosure. The electronic device 800 may be a terminal device, where the terminal device may include, but is not limited to, a mobile terminal such as a mobile phone, a notebook computer, a digital broadcast receiver, a personal digital assistant (Personal Digital Assistant, abbreviated as PDA), a tablet computer (Portable Android Device, abbreviated as PAD), a portable multimedia player (Portable Media Player, abbreviated as PMP), a vehicle-mounted terminal (such as vehicle-mounted navigation terminal) or the like, and a fixed terminal such as a digital TV, a desktop computer or the like. The electronic device shown in FIG. 8 is merely an example, which should not impose any restrictions on functionalities and application scope of the embodiments of the present disclosure.

As shown in FIG. 8, the electronic device 800 may include a processing apparatus (such as a central processor, a graphics processor, etc.) 801, which may perform various appropriate actions and processes according to a program stored in a read only memory (Read Only Memory, abbreviated as ROM) 802 or a program loaded into a random access memory (Random Access Memory, abbreviated as RAM) 803 from a storage apparatus 808. In the RAM 803, various programs and data required for operations of the electronic device 800 are also stored. The processing apparatus 801, the ROM 802 and the RAM 803 are connected to each other through a bus 804. An input/output (I/O) interface 805 is also connected to the bus 804.

Generally, the following apparatuses may be connected to the I/O interface 805: an input apparatus 806, including, for example, a touch screen, a touch pad, a keyboard, a mouse, a camera, a microphone, an accelerometer, a gyroscope or the like; an output apparatus 807, including, for example, a liquid crystal display (Liquid Crystal Display, abbreviated as LCD), a speaker, a vibrator or the like; a storage apparatus 808, including, for example, a magnetic tape, a hard disk or the like; and a communication apparatus 809. The communication apparatus 809 may allow the electronic device 800 to communicate wirelessly or wiredly with a further device for data exchange. Although FIG. 8 shows an electronic device 800 with various apparatuses, comprehensibly, there is no such requirement that all the apparatuses shown should be implemented or provided. Alternatively, more or fewer apparatuses may be implemented or provided.

Particularly, according to the embodiments of the present disclosure, the processes described above with reference to the flowcharts can be implemented as a computer software program. For example, an embodiment of the present disclosure includes a computer program product including a computer program carried on a computer-readable medium, where the computer program contains program codes for executing the method shown in the flowcharts. In such an embodiment, the computer program can be downloaded and installed from the network through the communication apparatus 809, or installed from the storage apparatus 808 or from the ROM 802. When executed by the processing apparatus 801, the computer program performs the above-described functionalities defined in the method according to the embodiments of the present disclosure. An embodiment of the present disclosure further includes a computer program. The computer program, when running on an electronic device, performs the above-described functionalities defined in the method according to the embodiments of the present disclosure.

It should be noted that the above-described computer-readable medium in the present disclosure may be a computer-readable signal medium or a computer-readable storage medium or any combination thereof. The computer-readable storage medium may be, for example, but not limited to, an electrical, magnetic, optical, electromagnetic, infrared or semi-conductive system, apparatus or device, or any combination of the above. More specific examples of the computer-readable storage medium may include, but not limited to, an electrically connected portable computer disk with one or more wires, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium in which a program is contained or stored. The program can be used by or in combination with an instruction execution system, apparatus or device. In the present disclosure, the computer-readable signal medium may include a data signal propagated in a baseband or as a part of a carrier wave, where computer-readable program codes are carried. This propagated data signal may be in various forms, including but not limited to electromagnetic signals, optical signals or any suitable combination of the above. The computer-readable signal medium may also be any computer-readable medium other than the computer-readable storage medium. The computer-readable signal medium can send, propagate or transmit the program used by or in combination with the instruction execution system, apparatus or device. The program codes contained in the computer-readable medium can be transmitted using any suitable medium, including but not limited to: electric wires, optical cables, RF (radio frequency), etc., or any suitable combination of the above.

The computer-readable medium may be included in the above-described electronic device; or it may exist alone without being assembled into the electronic device.

The above-described computer-readable medium carries one or more programs which, when executed by the electronic device, enable the electronic device to execute the method shown in the above-described embodiments.

Computer program codes for performing the operations of the present disclosure can be written in one or more programming languages or a combination thereof. The above-described programming languages include object-oriented programming languages such as Java, Smalltalk and C++, and conventional procedural programming languages such as "C" language or similar programming languages. The program codes can be completely executed on a user computer, partially executed on a user computer, executed as an independent software package, partially executed on a user computer and partially executed on a remote computer, or completely executed on a remote computer or a server. In a case related to the remote computer, the remote computer can be connected to a user computer through any kind of networks, including a local area network (Local Area Network, abbreviated as LAN) or a wide area network (Wide Area Network, abbreviated as WAN), or can be connected to an external computer (for example, being connected over Internet with use of an Internet service provider).

The flowcharts and block diagrams in the drawings illustrate architectures, functionalities and operations of possible implementations of the system, the method and the computer program product according to various embodiments of the present disclosure. In this regard, each block in the flowcharts or block diagrams may represent a module, a program segment or part of codes, which contains one or more executable instructions for implementing specified logical functionalities. It should also be noted that, in some alternative implementations, the functionalities marked in the blocks may also occur in an order different from that marked in the drawings. For example, two blocks shown in succession can actually be executed in a substantially parallel manner, and sometimes they can be executed in a reverse order, depending on the functionalities involved. It should also be noted that each block in the block diagrams and/or the flowcharts, and a combination of blocks in the block diagrams and/or the flowcharts, may be implemented by a dedicated hardware-based system that performs specified functionalities or operations, or may be implemented by a combination of dedicated hardware and computer instructions.

The units involved in the embodiments described in the present disclosure may be implemented by means of software or hardware. In some cases, unit names do not limit the units intrinsically. For example, a first acquiring unit can also be described as "a unit acquiring at least two Internet protocol addresses".

The functionalities described above herein can be at least partially performed by one or more hardware logic components. For example, non-restrictively, the hardware logic components that can be used include the following exemplary types: a field programmable gate array (FPGA), an application specific integrated circuit (ASIC), an application specific standard product (ASSP), a system on chip (SOC), a complex programmable logic device (CPLD) and the like.

In the context of the present disclosure, a machine-readable medium can be a tangible medium in which a program used by or in combination with an instruction execution system, apparatus or device can be contained or stored. The machine-readable medium can be a machine-readable signal medium or a machine-readable storage medium. The machine-readable medium may include, but not limited to, an electronic, magnetic, optical, electromagnetic, infrared, or semiconductor system, apparatus or device, or any suitable combination of the foregoing. More specific examples of the machine-readable storage medium may include an electrically connected, portable computer disk based on one or more wires, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

In a first aspect, according to one or more embodiments of the present disclosure, a video processing method is provided. The method is applied to a terminal device. The method includes: adding a first video capturing window in a video capturing interface and adjusting a frame of the first video capturing window in response to a first user operation; capturing a first original video; cropping the first original video according to the frame of the first video capturing window to obtain a first target video corresponding to the first video capturing window.

According to one or more embodiments of the present disclosure, after the obtaining the first target video corresponding to the first video capturing window, the method further includes: adding a second video capturing window in the video capturing interface and adjusting a frame of the second video capturing window in response to a second user operation; capturing a second original video; cropping the second original video according to the frame of the second video capturing window to obtain a second target video corresponding to the second video capturing window; where the first video capturing window and the second video capturing window are located in different areas of the video capturing interface.

According to one or more embodiments of the present disclosure, after the obtaining the second target video corresponding to the second video capturing window, the method further includes: generating a composite video according to the first target video and the second target video; where an image area of the composite video includes a first area for presenting an image of the first target video and a second area for presenting an image of the second target video; the image area of the composite video is determined based on the video capturing interface, the first area matches the frame of the first video capturing window, and the second area matches the frame of the second video capturing window.

According to one or more embodiments of the present disclosure, during a playing process of the composite video, the first target video is played in the first area, and the second target video is played in the second area following completion of playing of the first target video.

According to one or more embodiments of the present disclosure, the cropping the first original video according to the frame of the first video capturing window to obtain the first target video corresponding to the first video capturing window include: determining an externally attached graphic corresponding to the frame of the first video capturing window, and scaling the first original video into the externally attached graphic, where the externally attached graphic has a same shape as a picture of the first original video; cropping a video picture in the externally attached graphic according to the frame of the first video capturing window to obtain the first target video corresponding to the first video capturing window.

According to one or more embodiments of the present disclosure, the adding the first video capturing window in the video capturing interface and the adjusting the frame of the first video capturing window in response to the first user operation include: displaying a plurality of selectable frames; and determining the frame of the first video capturing window from the plurality of selectable frames in response to a user selection operation.

According to one or more embodiments of the present disclosure, the adding the first video capturing window in the video capturing interface and the adjusting the frame of the first video capturing window in response to the first user operation include: in response to a user addition operation, adding a first video capturing window having a preset frame in the video capturing interface; and in response to a user drawing operation, adjusting the frame of the first video capturing window.

According to one or more embodiments of the present disclosure, the frame of the first video capturing window is used to indicate a position, a shape and a dimension of the first video capturing window.

In a second aspect, according to one or more embodiments of the present disclosure, a terminal device is provided, including: a response unit, configured to add a first video capturing window in a video capturing interface and adjust a frame of the first video capturing window in response to a first user operation; a capturing unit, configured to capture a first original video; and a processing unit, configured to crop the first original video according to the frame of the first video capturing window to obtain a first target video corresponding to the first video capturing window.

According to one or more embodiments of the present disclosure, after the first target video corresponding to the first video capturing window is obtained, the response unit is further configured to add a second video capturing window in the video capturing interface and adjust a frame of the second video capturing window in response to a second user operation; the capturing unit is further configured to capture a second original video; the processing unit is further configured to crop the second original video according to the frame of the second video capturing window to obtain a second target video corresponding to the second video capturing window; where the first video capturing window and the second video capturing window are located in different areas of the video capturing interface.

According to one or more embodiments of the present disclosure, the processing unit is further configured to: after the second target video corresponding to the second video capturing window is obtained, generate a composite video according to the first target video and the second target video; where an image area of the composite video includes a first area for presenting an image of the first target video and a second area for presenting an image of the second target video; the image area of the composite video is determined based on the video capturing interface, the first area matches the frame of the first video capturing window, and the second area matches the frame of the second video capturing window.

According to one or more embodiments of the present disclosure, the terminal device further includes a playing unit. The playing unit is configured to: during a playing process of the composite video, play the first target video in the first area and play the second target video in the second area following completion of playing of the first target video.

According to one or more embodiments of the present disclosure, the processing unit is specifically configured to: determine an externally attached graphic corresponding to the frame of the first video capturing window, and scale the first original video into the externally attached graphic, where the externally attached graphic has a same shape as a picture of the first original video; crop a video picture in the externally attached graphic according to the frame of the first video capturing window to obtain the first target video corresponding to the first video capturing window.

According to one or more embodiments of the present disclosure, the response unit is specifically configured to: display a plurality of selectable frames; and determine the frame of the first video capturing window from the plurality of selectable frames in response to a user selection operation.

According to one or more embodiments of the present disclosure, the response unit is specifically configured to: in response to a user addition operation, add a first video capturing window having a preset frame in the video capturing interface; and in response to a user drawing operation, adjust the frame of the first video capturing window.

According to one or more embodiments of the present disclosure, the frame of the first video capturing window is used to indicate a position, a shape and a dimension of the first video capturing window.

In a third aspect, according to one or more embodiments of the present disclosure, a terminal device is provided, including: at least one processor and a memory; where the memory has a computer-executable instruction stored therein; the at least one processor executes the computer-executable instruction stored in the memory to enable the at least one processor to perform the video processing method as described above according to the first aspect and various possible designs of the first aspect.

In a fourth aspect, according to one or more embodiments of the present disclosure, a computer-readable storage medium is provided, in which a computer-executable instruction is stored, where when the computer-executable instruction is executed by a processor, the video processing method as described above according to the first aspect and various possible designs of the first aspect is implemented.

The above descriptions are only preferred embodiments of the present disclosure and illustrations of the applied technical principles. Those skilled in the art should understand that the disclosure scope involved in the present disclosure is not limited to the technical scheme formed from a specific combination of the above-described technical features, but covers other technical schemes formed from any combination of the above-described technical features or their equivalent features without departing from the above disclosed concept, such as a technical scheme formed from replacement of the above-described features with technical features having similar functionalities to those disclosed in (but not limited to) the present disclosure.

Furthermore, although the operations are depicted in a particular order, this does not mean a requirement that these operations should be performed in the particular order shown or in a sequential order. Under certain circumstances, multitasking and parallel processing may be beneficial. Similarly, although the above discussion contains several specific implementation details, these should not be interpreted as limitations on the scope of the present disclosure. Some features described in the context of separate embodiments also may be implemented in a single embodiment in combination. On the contrary, various features described in the context of a single embodiment also may be implemented in multiple embodiments separately or in any suitable sub-combinations.

Although the subject matter has been described in language specific to structural features and/or methodological logical actions, it will be appreciated that the subject matter defined in the appended claims is not necessarily limited to the specific features or actions described above. On the contrary, the specific features and actions described above are only exemplary forms for implementing the claims.

What is claimed is:

1. A video processing method applied to a terminal device, comprising:
    adding a first video capturing window in a video capturing interface and adjusting a frame of the first video capturing window in response to a first user operation;
    capturing a first original video; and
    cropping the first original video according to the frame of the first video capturing window to obtain a first target video corresponding to the first video capturing window;
    wherein the cropping the first original video according to the frame of the first video capturing window to obtain the first target video corresponding to the first video capturing window comprises:
    determining an externally attached graphic corresponding to the frame of the first video capturing window, and scaling the first original video into the externally attached graphic, wherein the externally attached graphic has a same shape as a picture of the first original video; and
    cropping a video picture in the externally attached graphic according to a shape of the frame of the first video capturing window to obtain the first target video corresponding to the first video capturing window;
    wherein after the obtaining the first target video corresponding to the first video capturing window, the method further comprises:
    adding a second video capturing window in the video capturing interface and adjusting a frame of the second video capturing window in response to a second user operation;
    capturing a second original video;
    cropping the second original video according to the frame of the second video capturing window to obtain a second target video corresponding to the second video capturing window;
    wherein the first video capturing window and the second video capturing window are located in different areas of the video capturing interface;
    wherein, after the obtaining the second target video corresponding to the second video capturing window, the method further comprises:
    generating a composite video according to the first target video and the second target video;
    wherein an image area of the composite video comprises a first area for presenting an image of the first target video and a second area for presenting an image of the second target video; the image area of the composite video is determined based on the video capturing interface, the first area matches the frame of the first video capturing window, and the second area matches the frame of the second video capturing window;
    wherein during a playing process of the composite video, the first target video is played in the first area, and the second target video is played in the second area following completion of playing of the first target video.

2. The method according to claim 1, wherein the adding the first video capturing window in the video capturing interface and the adjusting the frame of the first video capturing window in response to the first user operation comprise:
　　displaying a plurality of selectable frames; and
　　determining the frame of the first video capturing window from the plurality of selectable frames in response to a user selection operation.

3. The method according to claim 1, wherein the adding the first video capturing window in the video capturing interface and the adjusting the frame of the first video capturing window in response to the first user operation comprise:
　　in response to a user addition operation, adding the first video capturing window having a preset frame in the video capturing interface; and
　　in response to a user drawing operation, adjusting the frame of the first video capturing window.

4. The method according to claim 1, wherein the frame of the first video capturing window is used to indicate a position, a shape and a dimension of the first video capturing window.

5. A terminal device, comprising:
　　a processor and a memory;
　　wherein the memory stores a computer-executable instruction;
　　the processor performs the computer-executable instruction stored in the memory to:
　　add a first video capturing window in a video capturing interface and adjust a frame of the first video capturing window in response to a first user operation;
　　capture a first original video; and
　　crop the first original video according to the frame of the first video capturing window to obtain a first target video corresponding to the first video capturing window;
　　wherein the processor performs the computer-executable instruction stored in the memory further to:
　　determine an externally attached graphic corresponding to the frame of the first video capturing window, and scale the first original video into the externally attached graphic, wherein the externally attached graphic has a same shape as a picture of the first original video; and
　　crop a video picture in the externally attached graphic according to a shape of the frame of the first video capturing window to obtain the first target video corresponding to the first video capturing window;
　　wherein after the obtaining the first target video corresponding to the first video capturing window, the processor performs the computer-executable instruction stored in the memory further to:
　　add a second video capturing window in the video capturing interface and adjust a frame of the second video capturing window in response to a second user operation;
　　capture a second original video;
　　crop the second original video according to the frame of the second video capturing window to obtain a second target video corresponding to the second video capturing window;
　　wherein the first video capturing window and the second video capturing window are located in different areas of the video capturing interface;
　　wherein, after the obtaining the second target video corresponding to the second video capturing window, the processor performs the computer-executable instruction stored in the memory further to:
　　generate a composite video according to the first target video and the second target video;
　　wherein an image area of the composite video comprises a first area for presenting an image of the first target video and a second area for presenting an image of the second target video; the image area of the composite video is determined based on the video capturing interface, the first area matches the frame of the first video capturing window, and the second area matches the frame of the second video capturing window;
　　wherein during a playing process of the composite video, the first target video is played in the first area, and the second target video is played in the second area following completion of playing of the first target video.

6. The terminal device according to claim 5, wherein the processor performs the computer-executable instruction stored in the memory further to:
　　display a plurality of selectable frames; and
　　determine the frame of the first video capturing window from the plurality of selectable frames in response to a user selection operation.

7. The terminal device according to claim 5, wherein the processor performs the computer-executable instruction stored in the memory further to:
　　in response to a user addition operation, add the first video capturing window having a preset frame in the video capturing interface; and
　　in response to a user drawing operation, adjust the frame of the first video capturing window.

8. The terminal device according to claim 5, wherein the frame of the first video capturing window is used to indicate a position, a shape and a dimension of the first video capturing window.

9. A non-transitory computer-readable storage medium in which a computer-executable instruction is stored, wherein the computer-executable instruction, when executed by a processor, implements the following steps:
　　adding a first video capturing window in a video capturing interface and adjusting a frame of the first video capturing window in response to a first user operation;
　　capturing a first original video; and
　　cropping the first original video according to the frame of the first video capturing window to obtain a first target video corresponding to the first video capturing window;
　　wherein the cropping the first original video according to the frame of the first video capturing window to obtain the first target video corresponding to the first video capturing window comprises:
　　determining an externally attached graphic corresponding to the frame of the first video capturing window, and scaling the first original video into the externally attached graphic, wherein the externally attached graphic has a same shape as a picture of the first original video; and
　　cropping a video picture in the externally attached graphic according to a shape of the frame of the first video capturing window to obtain the first target video corresponding to the first video capturing window;
　　wherein the computer-executable instruction, after obtaining the first target video corresponding to the first video capturing window, further implements the following steps:

adding a second video capturing window in the video capturing interface and adjusting a frame of the second video capturing window in response to a second user operation;

capturing a second original video;

cropping the second original video according to the frame of the second video capturing window to obtain a second target video corresponding to the second video capturing window;

wherein the first video capturing window and the second video capturing window are located in different areas of the video capturing interface;

wherein the computer-executable instruction, after obtaining the second target video corresponding to the second video capturing window, further implements the following steps:

generating a composite video according to the first target video and the second target video;

wherein an image area of the composite video comprises a first area for presenting an image of the first target video and a second area for presenting an image of the second target video; the image area of the composite video is determined based on the video capturing interface, the first area matches the frame of the first video capturing window, and the second area matches the frame of the second video capturing window;

wherein during a playing process of the composite video, the first target video is played in the first area, and the second target video is played in the second area following completion of playing of the first target video.

* * * * *